No. 765,698. PATENTED JULY 26, 1904.
K. BURROWES.
DEVICE FOR MUSIC INSTRUCTION.
APPLICATION FILED JULY 7, 1903.
NO MODEL.
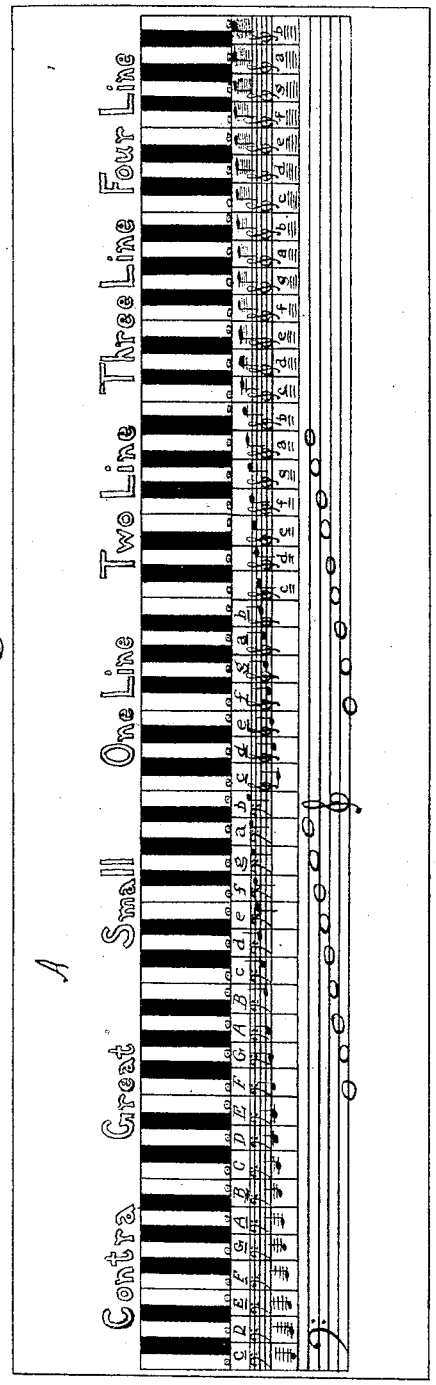
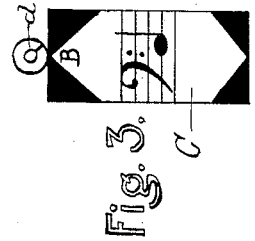
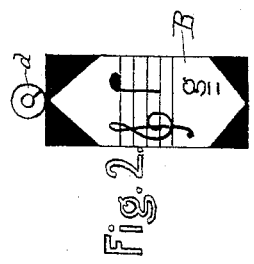
Witnesses
Ernest William Pearson
Walter Mann
Inventor
Katharine Burrowes
per James Burrowes Noble
Attorney No. 765,698.

Patented July 26, 1904.

UNITED STATES PATENT OFFICE.

KATHARINE BURROWES, OF DETROIT, MICHIGAN.

DEVICE FOR MUSIC INSTRUCTION.

SPECIFICATION forming part of Letters Patent No. 765,698, dated July 26, 1904.

Application filed July 7, 1903. Serial No. 164,612. (No model.)

*To all whom it may concern:*

Be it known that I, KATHARINE BURROWES, a citizen of the United States of America, residing at Detroit, in the county of Wayne and State of Michigan, have invented certain new and useful Improvements in Devices for Music Instruction; and I do hereby declare that the following is a full, clear, and exact description of the same, reference being had therein to the accompanying drawings, which form a part of this specification.

My invention relates to educational apparatus, and has for its object an improved device for teaching and fixing in the minds of the pupils the theory and practice of rudimentary music.

Said device for teaching rudimentary music, as aforesaid, is illustrated in the accompanying drawings, in which—

Figure 1 is a keyboard-chart representing a pianoforte-keyboard containing blocks used in combination therewith.

Referring to Fig. 1, A is a keyboard-chart representing a pianoforte-keyboard seven octaves in length, containing in all forty-nine white keys and thirty-five black keys. Upon each white key is fixed a hook, and upon each of said hooks hangs an oblong block one and three-fourths inches long and three-fourths of an inch in width and one-fourth of an inch in thickness, (see Figs. 2 and 3,) which is used in combination with the chart. Above each octave in the represented keyboard is printed the name by which such octave is known in theoretical music. Below said keyboard is represented a musical staff on which are indicated the treble and bass clefs and which is merely used to illustrate the appearance of a staff containing note characters.

Fig. 2 shows one of the blocks representing G in the two-line octave.

Referring to Fig. 2, B shows one of the blocks used in combination with the said keyboard-chart, Fig. 1, having imprinted upon its face a treble-clef with a staff having upon it the note character representing G in the two-line octave. In addition is printed upon the face of said block the small letter "*g*" with two lines underneath, showing that this particular character represents G in the two-line octave and is used only in connection with its corresponding note on the keyboard, and the block is provided with a hook *d*.

Fig. 3 shows another of the blocks representing B in the great octave.

Referring to Fig. 3, C shows another of the blocks used in combination with the said keyboard-chart, Fig. 1, having imprinted upon its face a bass-clef with a staff having upon it the note character representing B in the great octave. In addition is printed upon the face of said block the capital letter "B," such letter indicating that this block represents B in the great octave, and said block is used only in connection with its corresponding note on the keyboard, and the block is provided with a hook *d*.

The row of blocks, each hanging upon the representative of a certain white key and having imprinted upon its face the staff notation corresponding with that key, can be connected in the pupil's mind and identified with the actual white key on the piano-keyboard, because each block representing a separate note forms part of a continuous representation of the entire gamut of a seven-octave pianoforte.

The methods of using the blocks are numerous. One consists in the pupil removing certain blocks from their attachments and placing them upon the corresponding keys of the piano and naming each one as placed. Another is for the pupil to identify any block described by the teacher, and, if correct, the block is given to the pupil, the pupil holding the greatest number of blocks at the completion of the exercise being entitled to the greatest number of marks. Another is the pupil removing and replacing certain blocks belonging to the line or space of the staff—as, for example, E G B D F—in accordance with the words of certain songs written for the purpose, and when the letter is mentioned in the song the pupil takes off the block.

What I claim is—

In a device for musical kindergarten instruction and for teaching the rudiments of music, a chart representing a piano-keyboard seven octaves long with the musical name of each octave printed in large letters above such octave, with hooks upon those parts of the chart which represent the white keys or digitals of the piano-keyboard, and blocks of an oblong shape, the size of a lower part of a white digital, to be attached thereto having the staff notation sign corresponding to every white digital on a seven-octave piano-keyboard.

In testimony whereof I affix my signature, in the presence of two witnesses, at Detroit, this 24th day of March, 1903.

KATHARINE BURROWES.

Witnesses:
WILLIAM H. MOORE,
ELLA D. COOLEY.